US008081188B2

(12) United States Patent
Kihara

(10) Patent No.: US 8,081,188 B2
(45) Date of Patent: Dec. 20, 2011

(54) IMAGE DELIVERING APPARATUS AND IMAGE DELIVERY METHOD

(75) Inventor: Yuka Kihara, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 1036 days.

(21) Appl. No.: 12/000,706

(22) Filed: Dec. 17, 2007

(65) Prior Publication Data

US 2008/0150968 A1 Jun. 26, 2008

(30) Foreign Application Priority Data

Dec. 25, 2006 (JP) ................................ 2006-347542

(51) Int. Cl.
*G06T 11/00* (2006.01)
*G06K 9/72* (2006.01)
(52) U.S. Cl. ......... 345/467; 345/468; 345/470; 382/229
(58) Field of Classification Search .................. 345/467, 345/468, 470; 382/229
See application file for complete search history.

(56) References Cited

U.S. PATENT DOCUMENTS

| 4,935,821 | A | * | 6/1990 | Sano et al. ..................... 358/401 |
| 5,101,436 | A | * | 3/1992 | DeAguiar et al. ............. 382/241 |
| 5,226,116 | A | * | 7/1993 | Sasaki ............................ 345/467 |
| 5,227,772 | A | * | 7/1993 | Takebe .......................... 345/472 |
| 5,379,350 | A | * | 1/1995 | Shimazu et al. ............... 382/197 |
| 5,404,436 | A | * | 4/1995 | Hamilton ...................... 345/472 |
| 5,499,332 | A | * | 3/1996 | Yoshida ......................... 345/467 |
| 5,617,115 | A | * | 4/1997 | Itoh et al. ....................... 345/467 |
| 5,684,510 | A | * | 11/1997 | Brassell et al. ................ 345/443 |
| 5,757,384 | A | * | 5/1998 | Ikeda et al. .................... 345/468 |
| 5,890,184 | A | * | 3/1999 | Ooishi ........................... 715/203 |
| 5,982,508 | A | * | 11/1999 | Kashihara ..................... 358/3.08 |
| 6,011,865 | A | * | 1/2000 | Fujisaki et al. ............... 382/189 |
| 6,134,338 | A | * | 10/2000 | Solberg et al. ................ 382/113 |
| 6,332,666 | B1 | * | 12/2001 | Ikeda .............................. 347/40 |
| 6,614,431 | B1 | * | 9/2003 | Collodi .......................... 345/426 |
| 2002/0051494 | A1 | * | 5/2002 | Yamaguchi et al. ...... 375/240.16 |
| 2002/0154134 | A1 | * | 10/2002 | Matsui .......................... 345/582 |
| 2003/0152279 | A1 | * | 8/2003 | Ohtani et al. ................. 382/236 |
| 2004/0114731 | A1 | * | 6/2004 | Gillett et al. ................ 379/88.03 |
| 2004/0205486 | A1 | * | 10/2004 | Kurumida ................... 715/501.1 |
| 2004/0218836 | A1 | * | 11/2004 | Kanatsu ........................ 382/305 |
| 2004/0220898 | A1 | * | 11/2004 | Eguchi et al. ..................... 707/1 |
| 2004/0257367 | A1 | * | 12/2004 | Smith et al. ................... 345/441 |

(Continued)

FOREIGN PATENT DOCUMENTS

JP 05-290161 11/1993

(Continued)

OTHER PUBLICATIONS

Office Action dated Sep. 7, 2011 by the Japanese Patent Office for corresponding Japanese Application No. 2006-347542.

*Primary Examiner* — Xiao Wu
*Assistant Examiner* — David T Welch
(74) *Attorney, Agent, or Firm* — Harness, Dickey & Pierce, P.L.C.

(57) ABSTRACT

A determining unit determines a vector conversion method for a character image based on the character image and model information of a terminal device that receives the character image. A processing unit performs a vector conversion on the character image by the vector conversion method determined by the determining unit.

10 Claims, 11 Drawing Sheets

U.S. PATENT DOCUMENTS

| | | | |
|---|---|---|---|
| 2005/0068331 A1* | 3/2005 | Sekiguchi et al. | 345/589 |
| 2005/0111745 A1* | 5/2005 | Kato et al. | 382/243 |
| 2005/0140679 A1* | 6/2005 | Kaneda | 345/441 |
| 2005/0146528 A1 | 7/2005 | Kotiranta | |
| 2005/0185044 A1* | 8/2005 | Sasaki | 347/239 |
| 2006/0008114 A1* | 1/2006 | Sekiguchi et al. | 382/100 |
| 2006/0010116 A1* | 1/2006 | Yaguchi et al. | 707/3 |
| 2006/0114484 A1* | 6/2006 | Kitora | 358/1.13 |
| 2007/0022293 A1* | 1/2007 | Hayashi et al. | 713/176 |
| 2007/0055885 A1* | 3/2007 | Yamazaki et al. | 713/176 |
| 2007/0086667 A1* | 4/2007 | Dai et al. | 382/242 |
| 2007/0097394 A1* | 5/2007 | Zaima et al. | 358/1.13 |

FOREIGN PATENT DOCUMENTS

| | | |
|---|---|---|
| JP | 05-334430 | 12/1993 |
| JP | 06-076035 | 3/1994 |
| JP | 11-190990 | 7/1999 |
| JP | 2000-259142 | 9/2000 |
| JP | 2003-067670 | 3/2003 |
| JP | 2004-310250 | 11/2004 |
| JP | 2004-334461 | 11/2004 |
| JP | 2005-174227 | 6/2005 |
| JP | 2007-517251 | 6/2007 |

* cited by examiner (3 × 3 SUB-PATTERNS AND SCANNING MODES)

CONDITION 4 ($\Phi>0$)

CONDITION 5 ($\Phi>0$)

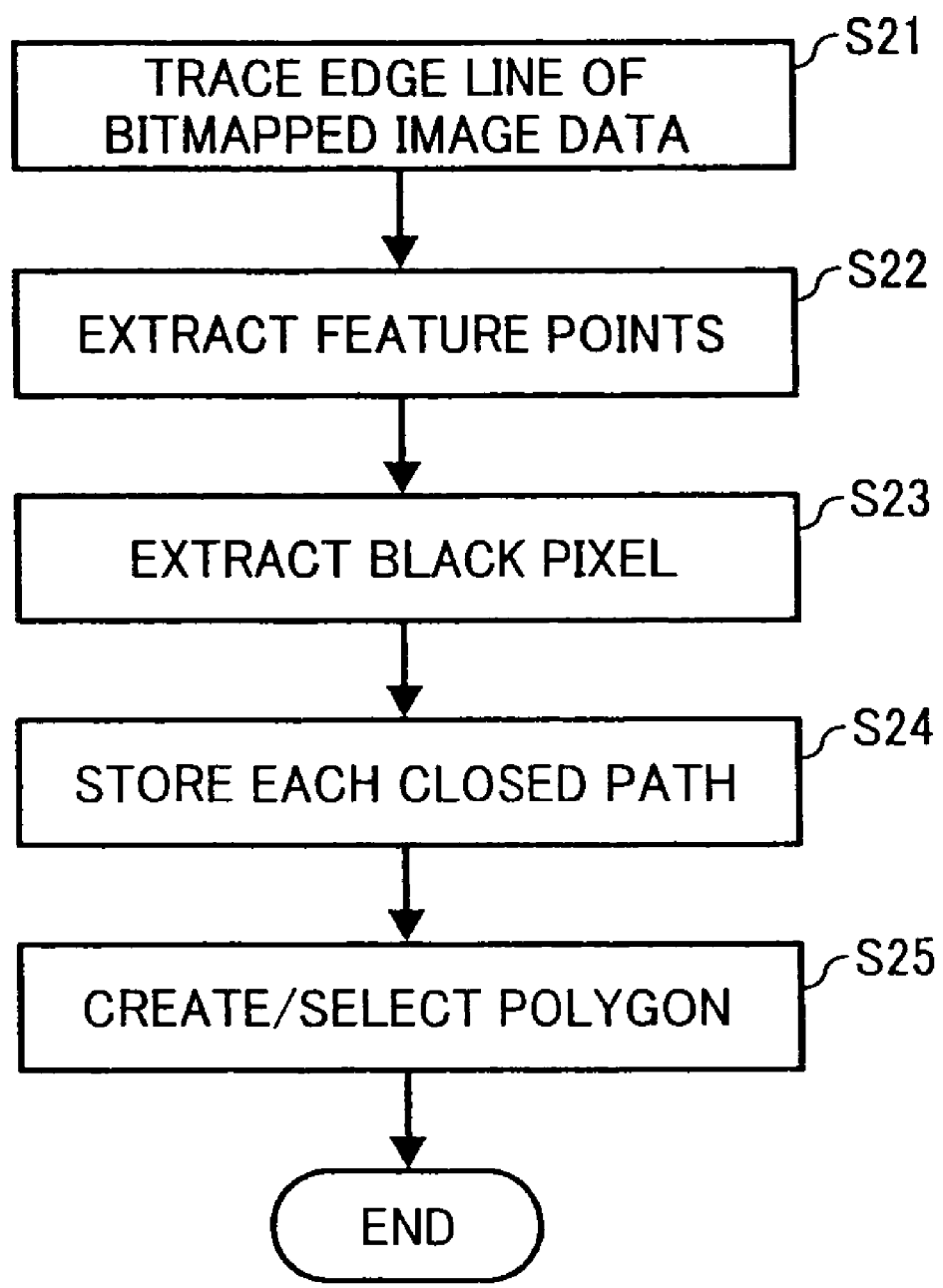

IMAGE DELIVERING APPARATUS AND IMAGE DELIVERY METHOD

CROSS-REFERENCE TO RELATED APPLICATIONS

The present application claims priority to and incorporates by reference the entire contents of Japanese priority document 2006-347542 filed in Japan on Dec. 25, 2006.

BACKGROUND OF THE INVENTION

1. Field of the Invention

The present invention relates to an image delivering apparatus, and, more particularly to an image delivering apparatus suitable for converting character images into vector data and displaying the vector data on various potential terminal monitors.

2. Description of the Related Art

In recent years, image data input from an image input device such as a scanner is fed to a calculator and processed according to the purpose. For example, after segmenting bit-mapped image data input from the image input device, the calculator extracts edge lines and performs line segment approximation of the edge lines, to convert the input data into vector format that can be easily processed (see, for example, Japanese Patent Application Laid-open No. H5-334430).

Vector format refers to a data representation format in which data is represented in terms of coordinates of the start points and end points of the segments on the image, the segments being obtained by line segment approximation. Data volume markedly reduces when the data is converted into vector format, which is desirable from the point of view of the calculation process. However, if the image to be processed contains character data, it becomes important whether the character image displayed after the conversion into vector format is legible.

A method in which the edge lines are traced, extracted, and subjected to polyline approximation is widely used as a method for converting a complete image that includes characters into vector data (see, for example, Japanese Patent Application Laid-open No. H5-290161). However, character distortion occurs when the image after the conversion process is displayed in reduced size, and problems such as difficulty in deciphering the characters are encountered. To avoid such problems, the character data included in the image is separated from the image by feature extraction, character recognition is carried out by pattern matching, after which coding is performed using a combination of position coordinates and character codes (see, for example, Japanese Patent Application Laid-open No. H6-76035).

However, if coding is performed via character recognition, reliability of the information included in the character image becomes questionable when character recognition is not performed accurately. Methods to counter such problems are also proposed in which character images that are likely to be falsely recognized are not converted into character code data, but are output as character images (such as raster data) only. However, in such cases, an extreme difference in legibility and visual appeal of characters results between the character code data and the character image, which can be visually annoying. In an image in which characters are in the form of character codes, there is no proportional change in the character size when the image size is scaled up or down. Regardless of whether characters are stored as character images or character codes, if incorporation of processes such as scaling the size up or down at the time of delivery is envisaged, it would entail adding a restoration process, making the delivery process complex.

In recent years, many vector conversion methods have been proposed and a faithful reproduction of the original image is possible when a general image is converted into vector data. However, as mentioned earlier, in case of character images, maintaining the legibility of character images after vector conversion is an important issue, and the vector conversion process for obtaining the best display is determined depending on factors such as the character image and the display environment.

For example, in cases that require the image to be displayed in reduced size due to reasons such as small monitor of the display medium, if the earlier mentioned method that converts edge lines into vector data is used, there is character distortion. To prevent character distortion, measures such as converting the skeleton line into vector data and then displaying the characters as characters having line width of one dot are required. On the contrary, if the method that converts edge lines into vector data is used when the character size to be displayed is somewhat large, the shape of characters in the image can be faithfully reproduced and visual appeal is improved.

Thus, by selecting a vector conversion process that is appropriate for the character image, vector data with excellent legibility and visual appeal can be obtained, and various processes can be performed without encountering problems when converting characters into codes via character recognition described above.

SUMMARY OF THE INVENTION

It is an object of the present invention to at least partially solve the problems in the conventional technology.

An image delivering apparatus according to one aspect of the present invention includes a determining unit that determines a vector conversion method for a character image based on the character image and model information of a terminal device that receives the character image and a processing unit that performs a vector conversion on the character image by the vector conversion method determined by the determining unit.

An image delivering method according to another aspect of the present invention includes determining a vector conversion method for a character image based on the character image and model information of a terminal device that receives the character image and performing a vector conversion on the character image by the vector conversion method determined at the determining a vector conversion method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a flowchart of a process for converting edge line into vector data;

DETAILED DESCRIPTION OF THE PREFERRED EMBODIMENTS

Figure 1:
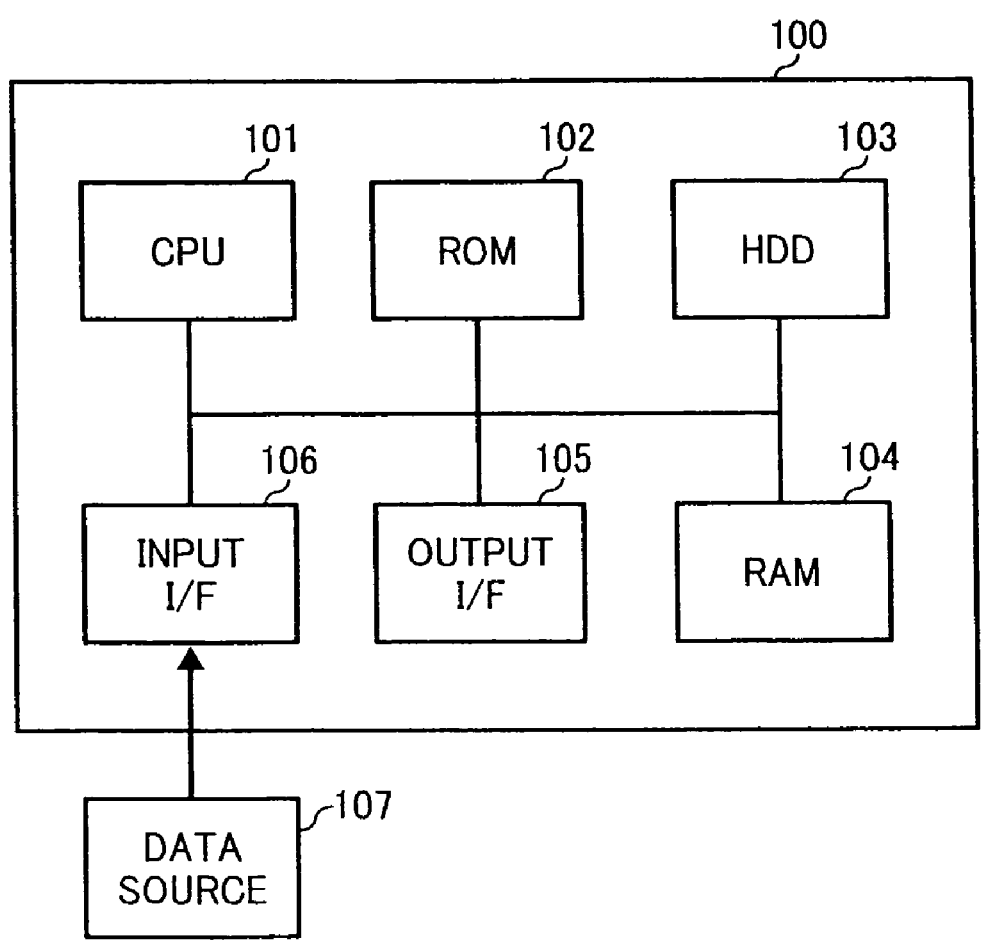
FIG. 1 is a block diagram of an image delivering apparatus according to the present invention.

Exemplary embodiments of the present invention are explained in detail below with reference to the accompanying drawings. FIG. 1 is a block diagram of an image delivering apparatus according to the present invention. As shown in FIG. 1, an image delivering apparatus 100 includes a central processing unit (CPU) 101, a read only memory (ROM) 102, a hard disk drive (HDD) 103 that stores programs and data required by the CPU, a random access memory (RAM) 104 that is a working memory for laying out data being processed or a program being executed, an output interface 105, and an input interface 106.

The input interface 106 accepts data input from a data source 107. The data source 107 may be a local or a remote computer, scanner, or a device that is capable of document generation, or a removable data storage medium such as a magnetic storage disk, a compact disk (CD), or a digital versatile disk (DVD). The data source 107 can also be a device capable of storing/transmitting electronic document data such as a network, intranet, Internet, or a document storage device of a multifunction peripheral (MFP). The output interface 105 is connected to a display device (not included in the image delivering apparatus). The display medium can be a liquid crystal monitor or a cathode ray tube (CRT) connected to a personal computer (PC), or a liquid crystal monitor of a mobile terminal such as a mobile phone or a personal digital assistant or any other display medium. Any network such as a local area network (LAN), an intranet, or the Internet can be used as the connection method, and can be wired or wireless. Although not shown, instructions from the user can also be accepted via a graphical user interface (GUI) of the display medium. The present invention is not limited to the configuration described above.

Figure 2:
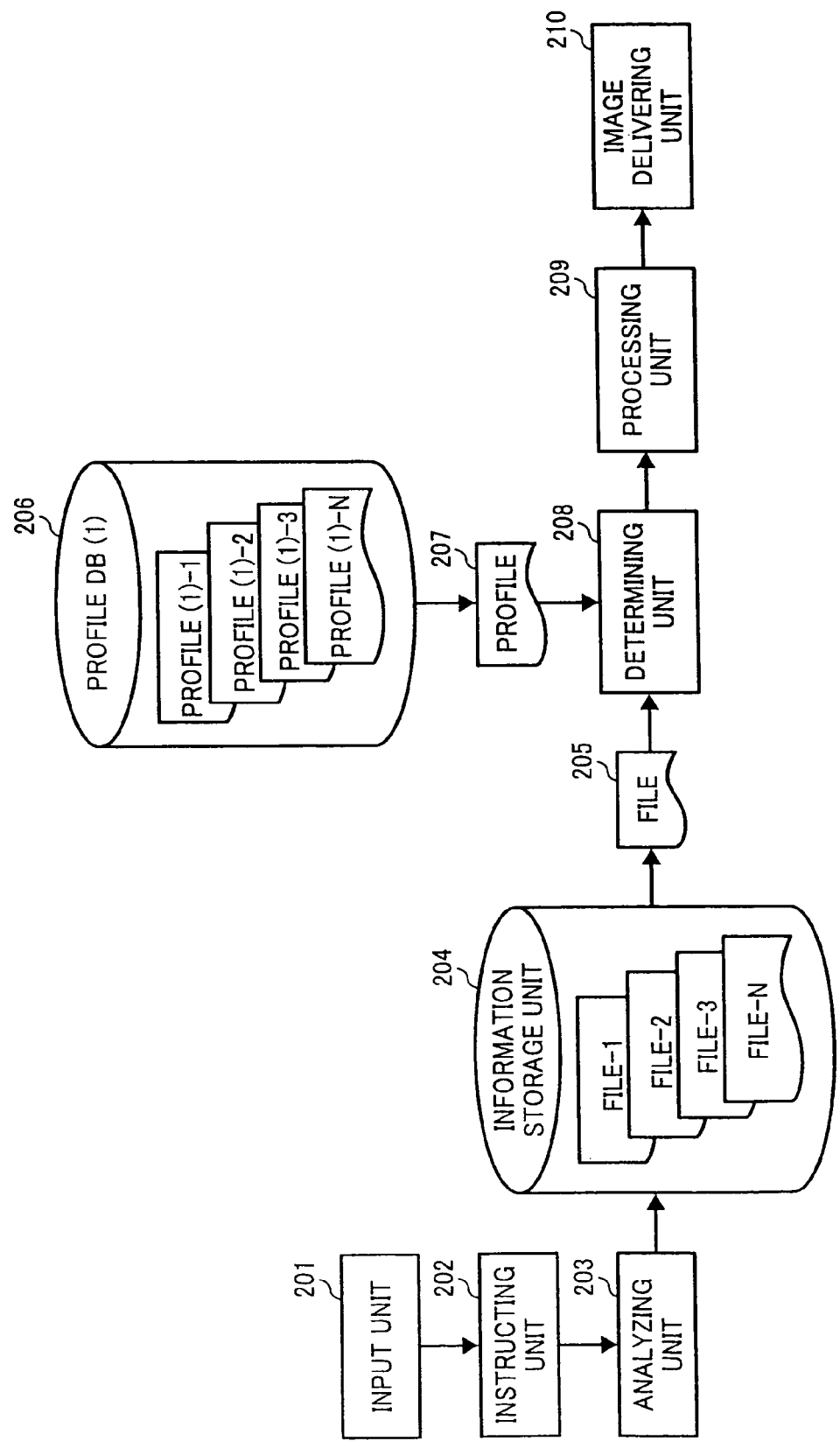
FIG. 2 is a schematic diagram of an image delivering apparatus according to a first embodiment of the present invention.

FIG. 2 is a schematic diagram of an image delivering apparatus according to a first embodiment of the present invention. An instructing unit 202 issues an instruction for an analysis process necessary for obtaining the information that forms a determining condition (for example, the character size when displaying a character image) for a determining unit 208 to select a vector conversion method for an input character image. An analyzing unit 203 analyses the input character image and stores the information obtained as a result of the analysis in an information storage unit 204.

As an analysis process for character image data, a known character recognition technology can also be used. As a method of character size recognition such as that described in Japanese Patent Application Laid-open No. 2000-259142, the length of the diagonal of the quadrilateral occupied by the character can be detected or the length and breadth of the quadrilateral occupied by the character can be detected.

If character strings of different sizes are present in the character image, the average value of character sizes in the whole image is calculated and stored in the information storage unit 204.

A profile database (DB) 206 provides the respective profiles 1 to N of terminal devices 1 to N. Data that includes the model information of the terminal devices is stored in the corresponding profiles. Examples of data stored in the profile DB 206 are the resolution and the dimensions of the display monitor and the processing power of the CPU. The types of stored data are not limited to the examples listed above. Although not shown, an example of the method of obtaining the information of models that is stored in the profile DB 206 is the exchange of necessary profile data negotiation among the information models.

Conditions that determine the vector conversion method can be set beforehand or a function of accepting instructions from the user can be incorporated. In the first embodiment, vector conversion method is determined based on the character size when the character image is displayed. To determine the character size, the dimensions (pixels) of the terminal monitor are obtained as the profile and the character size (pixels) and dimensions of character image (pixels) are obtained as the image information. The determining conditions are not limited to those mentioned above. For example, for determining the vector conversion method based on the length of a processing time, the resolution of the display monitor and the processing power of the CPU can be obtained as the profile, and the file size of the image can be obtained as the image information.

The determining unit 208 determines the vector conversion method by referring to an image data information file 205 and a profile 207 concerning model information. Depending on the determination, a processing unit 209 actually converts the character image into vector data, and an image delivering unit 210 delivers the converted data as vector data.

In the first embodiment, the input image is a character image. However, in case of a general image that includes character images, the earlier mentioned processing can be applied to the character part by carrying out a preprocessing that extracts the character image area, and a post-processing that integrates the extracted character images with the remaining image.

Figure 3:
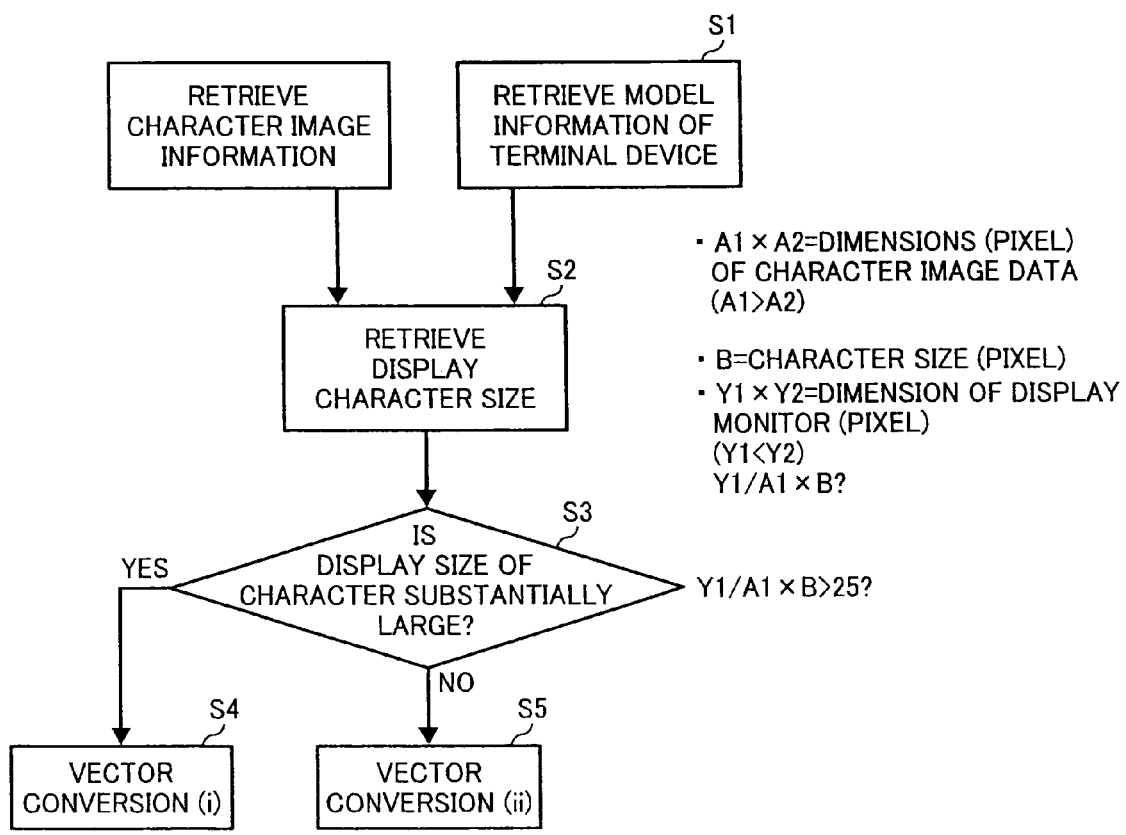
FIG. 3 is a flowchart of a vector conversion method determining process according to the first embodiment.

FIG. 3 is a flowchart of a vector conversion method determining process performed by the determining unit 208 by referring to the profile 207 and the image data information file 205 concerning the image. In the first embodiment, the vector conversion method is selected based on the display character size.

The determining unit selects the vector conversion method based on terminal monitor dimensions Y1×Y2 (pixels) obtained from the profile 207, and a character size B (pixels) and a character image size A1×A2 (pixels) obtained from the information storage unit 204 (step S1). If Y1<Y2, A1>A2, the determining unit 208 calculates the character size for displaying the image on the entire screen by Y1/A1×X (step S2). The determining unit 208 then determines whether the calculated value has crossed a predetermined threshold (step S3), and determines which of the vector conversion methods described below is to be used (steps S4 and S5). The threshold is set beforehand by a server administrator. For example, for Kanji characters having complex shapes, the threshold is set to 25 in view of character distortion below 25 dots.

In the first embodiment, if the display character size is substantially large, the determining unit 208 selects a vector conversion method in which edge lines are converted into vector data (step S4), and if the display character size is not substantially large, the determining unit 208 selects a vector conversion method in which the skeleton line is converted into vector data (step S5). However, vector conversion methods are not limited to those described above, and a vector conversion method can be selected that is suitable for small characters displayed when the threshold is set to a low value.

The processing unit 209 performs a vector conversion process based on the determination by the determining unit 208. The character image data is converted into bitmapped data by an input unit 201 in the vector conversion method, whether it is conversion of edge lines into vector data or skeleton line into vector data.

Figure 4:
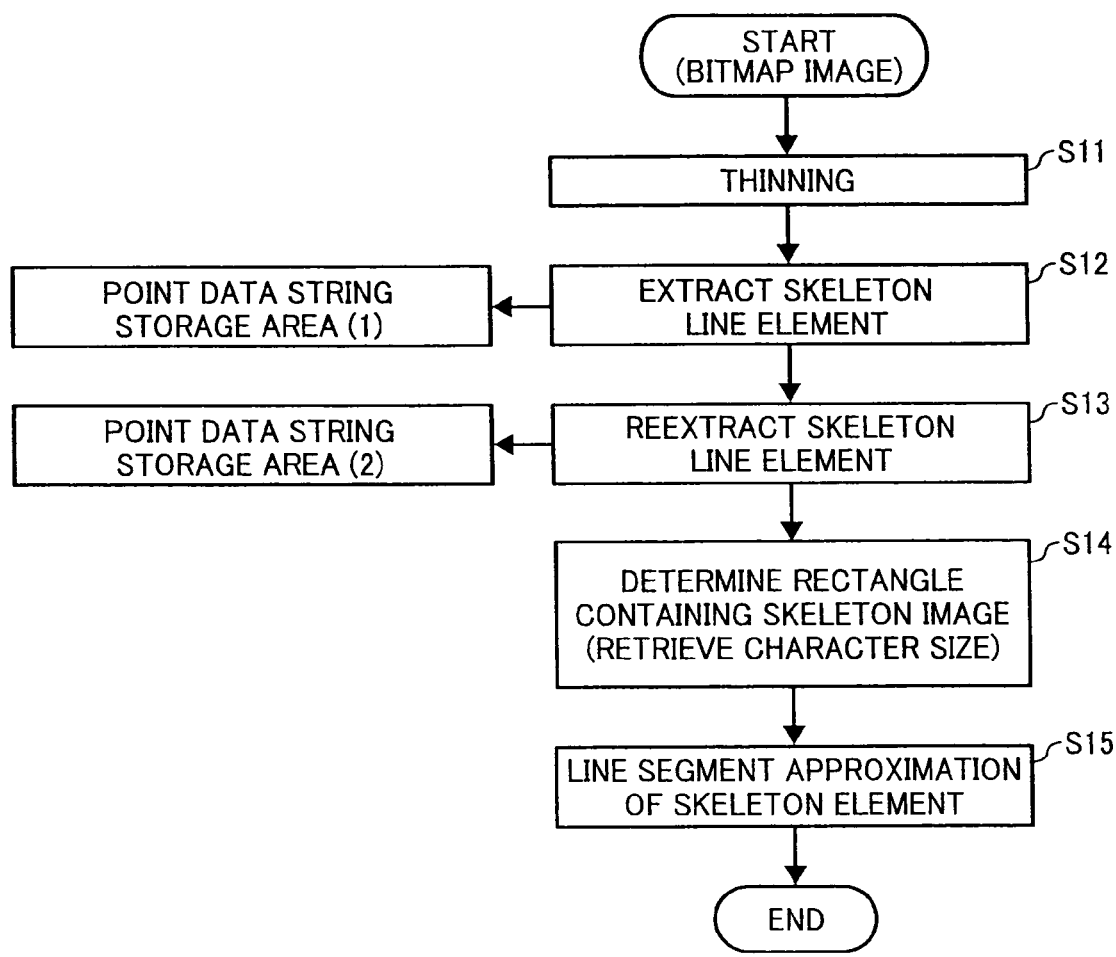
FIG. 4 is a flowchart of a process for converting skeleton line to vector data.

FIG. 4 is a flowchart of a process performed by the processing unit 209 to convert skeleton line to vector data. To extract skeleton line pixels of a character, the processing unit 209 first performs a thinning process on the bitmapped image data (step S11). Thinning can be performed by a known method. Thinning for especially obtaining 8-connected components is performed in the first embodiment. The same process, however, can also be used for obtaining 4-connected components.

Figures 5A, 5B, 5C:
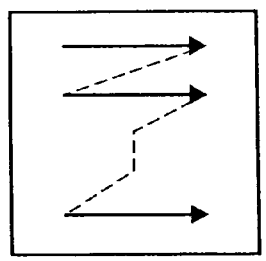
FIGS. 5A to 5C are schematic diagrams for explaining a thinning process.

A process procedure for thinning is described below. The bitmapped image data is stored in a first image memory. The bitmapped image data is then read along the scanning direction of the screen, a known successive algorithm of city-block distance conversion is executed, and the result is sequentially stored in a second image memory. Next, for thinning, calculation is performed according to scanning modes 1 to 3 (see FIG. 5A). In other words, for every pixel, a specific 3×3 pixel sub-pattern is obtained corresponding to each of the scanning modes 1 to 3 as shown in FIG. 5A.

The image is first read according to the scanning mode 1. If the 3×3 pixel sub-pattern shown in FIG. 5A satisfies all the conditions (1) to (5) given below, the pixel value $\chi$ of the center pixel is replaced with $-\chi$. Otherwise, the sub-pattern shown in FIG. 5A is stored unchanged in the second image memory.

Condition (1): $\phi_3 \leq 0$ or $\phi_5 \leq 0$.
Condition (2): The connectivity number of the 8-neighborhood pixels $\phi_1$ to $\phi_8$ surrounding the pixel of interest $\chi$ is 1 in a bitmap pattern in which 1 is assigned when $\phi_5 > 0$ and 0 is assigned otherwise.
Condition (3): The absolute value of any of the 8-neighborhood pixels $\phi_1$ to $\phi_8$ is greater than the pixel value surrounding the pixel of interest $\chi$.
Condition (4): None of the four states shown in FIG. 5B is satisfied.
Condition (5): None of the four states shown in FIG. 5C is satisfied.

The contents of the first image memory are copied to the second image memory. Substantially identical calculations are carried out for the scanning modes 2 and 3, and the results of the calculations for all the pixels are progressively stored in a third image memory and a fourth image memory.

In the thinning process described above, some local portions are left out with two-line width. Therefore, as a subsequent post-processing, pixels are successively read, and if the 3×3 pixel sub-pattern satisfies all the four conditions stated below, $\chi$ is replaced with 0, otherwise $\chi$ is replaced with 1, and the bitmap pattern is stored in a fifth image memory.

Condition (1): There is a pixel having a value 0 or less in the 4-neighborhood pixels ($\phi_1$, $\phi_3$, $\phi_5$, $\phi_7$) surrounding the pixel of interest $\chi$.
Condition (2): The connectivity number of the 8-neighborhood pixels $\phi_1$ to $\phi_8$ surrounding the pixel of interest $\chi$ is 1 in a bitmap pattern in which 1 is assigned when $\phi_5 > 0$ and 0 is assigned otherwise.
Condition (3): There are two or more positive values among the 8-neighborhood pixel values $\phi_1$ to $\phi_8$ surrounding the pixel of interest $\chi$.
Condition (4): There are only two positive values among the 8-neighborhood pixel values $\phi_1$ to $\phi_8$ surrounding the pixel of interest $\chi$, and $\phi_4 = 0$, and the pixel value of the pixel in the image memory 3 that corresponds to $\phi_4$ is positive. In this case, condition (2) is still satisfied even if $\phi_4 = 1$ is assumed.

The processing unit 209 ends the thinning process when no further replacement is required for $\chi$ in post-processing.

The skeleton line is next converted into vector data, with the contents of the fifth image memory obtained after extraction of the skeleton line serving as the input image. In the first embodiment, as an example, one of the methods is explained for converting skeleton line into vector data. However, method for converting skeleton line into vector data is not limited to the method explained next. Hereafter, pixels having a pixel value of 1 will be referred to as black pixels, and those having a pixel value of 0 will be referred to as white pixels.

The processing unit 209 sequentially reads the image from the fifth image memory along the scanning direction of the screen, and stores it in a shift register. The processing unit 209 then retrieves the 3×3 pixel sub-patterns from the shift register. The processing unit 209 treats an untraced black pixel with no more than two black pixels above/below/to the left of/to the right of/diagonally to the black pixel as the starting point, and stores the coordinates of the pixel of interest in a point data string storage area (1).

After determining the starting point, the processing unit 209 starts tracing from the starting point towards a black pixel adjacent to the starting point and sequentially retrieves a 3×3 pixel sub-pattern for the pixel of interest. If a plurality of black pixels is present adjacent to the starting point, the processing unit 209 assigns an order of priority to the 8-neighborhood pixels around the pixel of interest, and continues tracing sequentially. While tracing, the processing unit 209 stores the direction of progression from the previous 3×3 pixel sub-pattern, and when changing to the next pixel of interest, stores the coordinates of the current pixel of interest in the point data string storage area (1).

If the pixels in all directions around a pixel of interest are all white pixels or already traced black pixels, the processing unit 209 stops tracing, and treats the pixel of interest to be the end point, and stores the coordinates of the pixel of interest in the point data string storage area (1). After tracing up to the end point, the processing unit 209 start scanning from the pixel next to the start point along the scanning direction and continues until image scanning is completed (step S12).

In the point data string storage area (1) which contains point data string (hereinafter, "path"), which includes transit points linked sequentially from the starting point to the end point, if a starting point of a path and a starting point of another path, or an end point of a path and an end point of another path, or an end point of a path and a starting point of another path are adjacent to each other, the processing unit 209 defines the concerned paths as a single path. If the starting point of Path 1 and the staring point of Path 2 are joined, the processing unit 209 treats the end point of Path 1 as the staring point, and the end point of Path 2 as the end point of the new path, wherein the transit points track back from the end point of Path 1 to the starting point of Path 2, and from the starting point of Path 2 to the end point in the sequence in which they are originally stored. If the end point of Path 1 and the end point of Path 2 are joined, the processing unit 209 treats the starting point of Path 1 as the starting point and the starting point of Path 2 as the end point of the new path, wherein the transit points follow in the sequence in which they are originally stored from the starting point of Path 1 to the end point of Path 2, and from the end point of Path 2 to the starting point in a reverse sequence. If the end point of Path 1 and the starting point of Path 2 are joined, the processing unit 209 treats the starting point of Path 1 as the starting point and the end point of Path 2 as the end point of the new path, wherein the transit points follow from the starting point of Path 1 to the starting point of Path 2 in the sequence in which they are originally stored, and from the starting point of Path 2 to the end point, again in the sequence in which they are originally stored. The processing unit 209 stores the newly defined paths along with their coordinates in a point data string storage area (2) (step S13).

Once the new paths are defined, the processing unit 209 proceeds to determine the smallest rectangle that will contain the starting point, the transit points, and the end point. For determining the smallest rectangle, the processing unit 209 stores the coordinates of the vertex of each rectangle in the point data string storage area (1). The processing unit 209 then determines the distance between two rectangles based on the vertices stored in the point data string storage area (1) (that is, the least distance between two rectangles, which would be the length of the line joining the vertices of the two rectangles). If the distance between the two rectangles is smaller than a threshold value determined by the maximum value of a side of the larger rectangle of the two, or if the two rectangles overlap, the processing unit 209 forms a new rectangle by combining the two rectangles, and replaces the existing coordinates in the point data string storage area (1) with the new coordinates of the newly defined rectangle.

The processing unit 209 stores in the point data string storage area (2) a maximum value M of the side of each of the rectangles, the coordinates of whose vertices are stored in the point data string storage area (1) (step S14).

The processing unit 209 then performs a process of discarding superfluous coordinates for each path stored in the point data string storage area (1). Specifically, the processing unit 209 compares the distance between the line joining the starting point and the end point through the transit points and the coordinates of the black pixel of the original image with the threshold value (which is a function of M). If the distance is less than the threshold value, the processing unit 209 repeats the process for the next transit point. Otherwise, the processing unit 209 retains only the coordinates of the black pixel and the coordinates of the transit point, discarding the coordinates of all the transit points between the two.

For large characters, a large threshold value is preferable so that "jaggedness" and unevenness can be avoided during the thinning process. On the other hand, for small characters, a small threshold value is preferable in view of intersection points and branching points. Therefore, a threshold value proportional to a value equivalent to the size of one character stored in the point data string storage area (2) is set.

The processing unit 209 repeats the process of replacing the starting point of the process with the transit point until the end point is reached. The processing unit 209 repeats the process for each path and extracts the coordinate data remaining in the point data string storage area as characteristic points (step S15).

FIG. 6 is a flowchart of a process performed by the processing unit 209 to convert the edge line into vector data. The processing unit 209 traces the edge line of the bitmapped image data and extracts the characteristic points (steps S21 and S22). Any known method can be used for Raster-to-vector (R/V) conversion by edge line tracing. For example, an R/V conversion software such as Potrace can be used. Potrace algorithm, which involves approximating the edge lines to straight lines and converting them to vector data, is explained below.

We will suppose that the bitmapped image is placed on a coordinate system having a grid pattern where each grid represents a pixel and corners of each pixel have integer coordinates.

The processing unit 209 first finds a black pixel on an edge, for example, the leftmost edge, and with the identified point as the starting point, traces the edge line towards the right, where a white pixel is present, and continues tracing thus until the starting point is reached. The processing unit 209 stores the series of coordinates of the edge line as a closed path (steps S23 and S24).

For each of the closed paths {v0, v1, and so on up to vn} a straight path and a polygon are defined as follows.

$$p = \{v0, v1, \ldots, vn = v0\} : \text{closed path}$$

(Straight Path)

When $d(vj, a) \leq \frac{1}{2}$ and $d(vk, b) \leq \frac{1}{2}$ are satisfied for points a and b and elements of p, vj and vk, and $d(yi, ci) \leq \frac{1}{2}$ is satisfied at a point ci on a line ab for $i = j, \ldots, k-1$, a line connecting the points a and b is referred to as an approximate line of a subset of the closed path {vj, vj+1, ..., vk}. At this time, if a subset q with three elements of p has an approximate line, it is referred to as a straight path q.

(Polygon)

When (i, j) is a pair of different integers from 0 to n−1, a path connecting vi and vj is defined as $$i \leq j \Rightarrow pij := \{vi, \ldots, vj\}$$

$$i > j \Rightarrow pij := \{vi, \ldots, vn-1, v0, \ldots, vj\}.$$

At this time, a polygon means that it is a sequence of integers $i0 \leq i1 \leq \ldots \leq im-1$ (vi0, vi1, ..., vim−1 are elements of p) and pik−1, ik+1+1, and pim−1 are straight paths for k=0, ..., m−1.

When forming polygons from a closed path, the coordinates that satisfy the condition described above are selected. There are several methods for selecting a polygon from among the polygons thus formed. The two methods mentioned below yield optimized polygons.

(1) Selecting a polygon with fewer line segments
(2) If the polygons have the same number of line segments, assigning a penalty on each line segment directly proportional to its distance from the vertex, and selecting the polygon whose sum of penalties is lesser The penalty $P_{i,j}$ for the line segment vivj, for example, is assigned as described in the polygon selection method (2) by Equation (1) given below.

$$P_{i,j} = |v_j - v_i| \times \sqrt{\frac{1}{P_{i,j}+1} \sum_{k=i}^{j} dist(v_k, v_i v_j)^2} \qquad (1)$$

where dist(a, bc) is the distance from point a to line segment bc, and Σ is a summation of distance. The processing unit 209 then extracts as characteristic points the coordinates of the vertices of the polygon selected by using either of the methods described above, and obtains an image by approximating the characteristic points by connecting lines (step S25).

The input image in the first embodiment is a character image. However, the processes and methods described in the embodiment can be applied to any regular image that includes therein a character image. However, in that case, the regular image needs to be subjected to a pre-process for extracting the character image area and a post-process for compositing the vectorized character image with the rest of the image.

The vector data obtained by the process described above by referring to the profile DB 206 and the information storage unit 204 to improve its display on the terminal monitor can be subjected to further processing and the vector image data obtained as a result can be stored in the information storage unit 204. For example, vector data of the character image can be created to suit the dimensions of the terminal monitor, and the vector data thus created can be stored in the information storage unit 204.

The structure of an image delivering apparatus according to a second embodiment is similar to that of the first embodiment (see FIG. 2). However, in the second embodiment, the selection of the vector conversion method is based on a plurality of conditions. Specifically, the conditions include processing time of the CPU and display size of the character.

Figure 7:
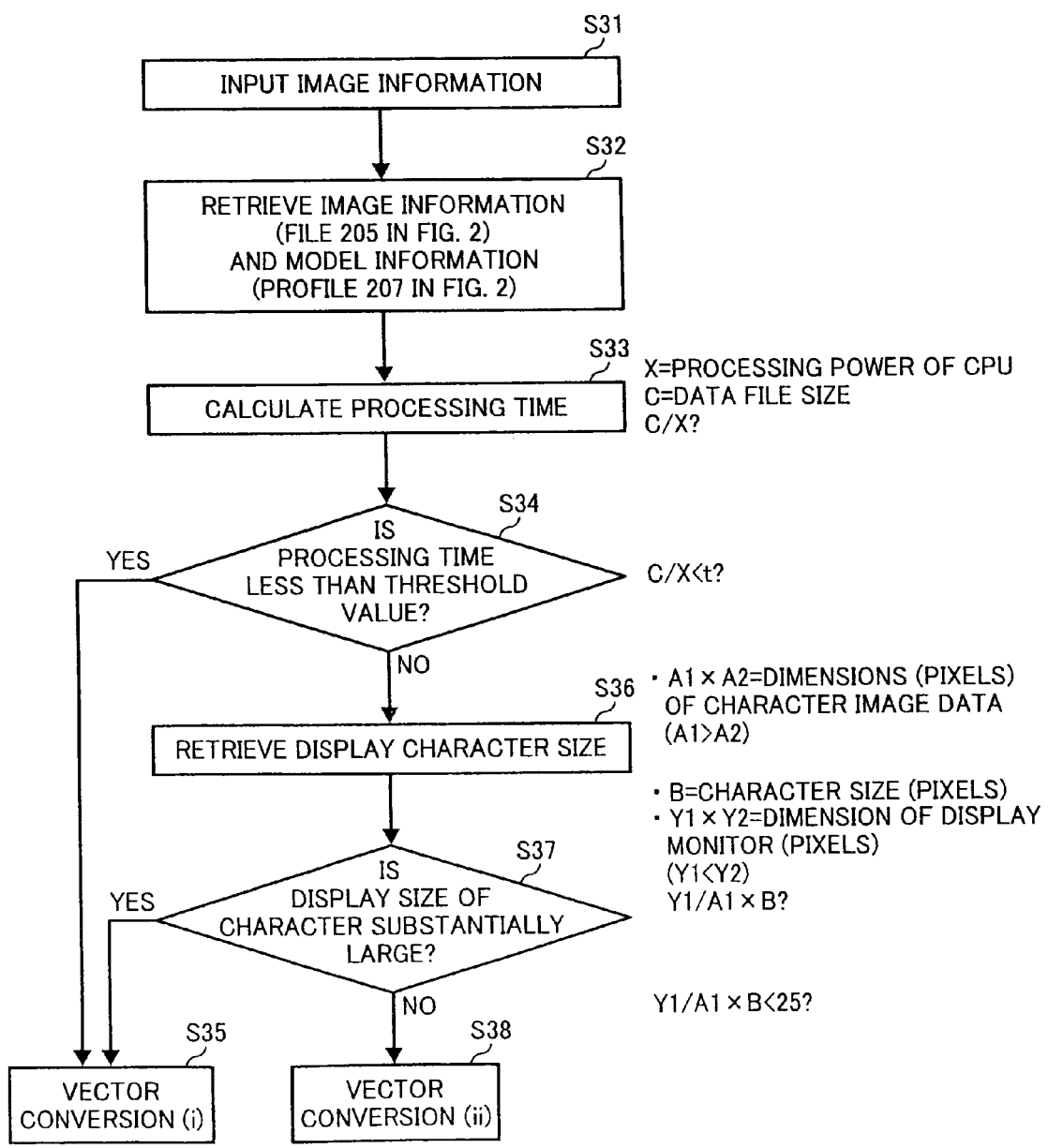
FIG. 7 is a flowchart of a vector conversion method determining process according to a second embodiment of the present invention.

FIG. 7 is a flowchart of a vector conversion method determining process according to the second embodiment performed by the determining unit 208 by referring to the processing time of the CPU and the display size of the character.

The determining unit 208 receives as inputs the image information and model information corresponding to the input image (steps S31 and S32). In the second embodiment, the profile DB 206, which stores data concerning machine model, in particular includes the dimensions of the terminal monitor and the processing power of the CPU, and the information storage unit 204, which stores data concerning character image, in particular includes character size, dimensions of the character image (pixels), and the file size of the character image.

Next, the determining unit 208 calculates the processing time (step S33). Specifically, if the processing power of the CPU is X and the file size of the image is C, the determining unit 208 determines the processing time by C/X. If the processing time is less than a threshold value t (step S34), the determining unit 208 selects the vector conversion method in which the edge line is converted to vector data (step S35). If the processing time is more than the threshold value t, the determining unit 208 determines the display size of one character by the method described in the first embodiment (see flowchart in FIG. 3) (step S36), and assesses the character size by comparing it with the threshold value (step S37). If the character size is substantially large, the determining unit 208 selects the vector conversion method in which the edge line is converted to vector data (step S35), and otherwise, selects the vector conversion method in which the skeleton line is converted to vector data (step S38).

Thus, when selecting the vector conversion method by referring to a plurality of profiles, the selection can be made at the final step after a plurality of steps as described above. Alternatively, the selection can be made together for all the profiles. In the description given above in which selection of the vector conversion method is made after a plurality of steps, as determining conditions, the processing time is first assessed first followed by the display size of the character. However, the order in which the determining conditions are assessed can be changed according to priority given to the processing time, quality, legibility, etc., at the server end or the user end.

In a third embodiment of the present invention, a character code conversion determining unit performs a pre-processing before the vector conversion method determining unit selects the vector conversion method. The character code conversion determining unit performs pattern matching, and converts the character images having a high accuracy into codes, and those having a low accuracy into vector data by the method described in the first embodiment.

Figure 8:
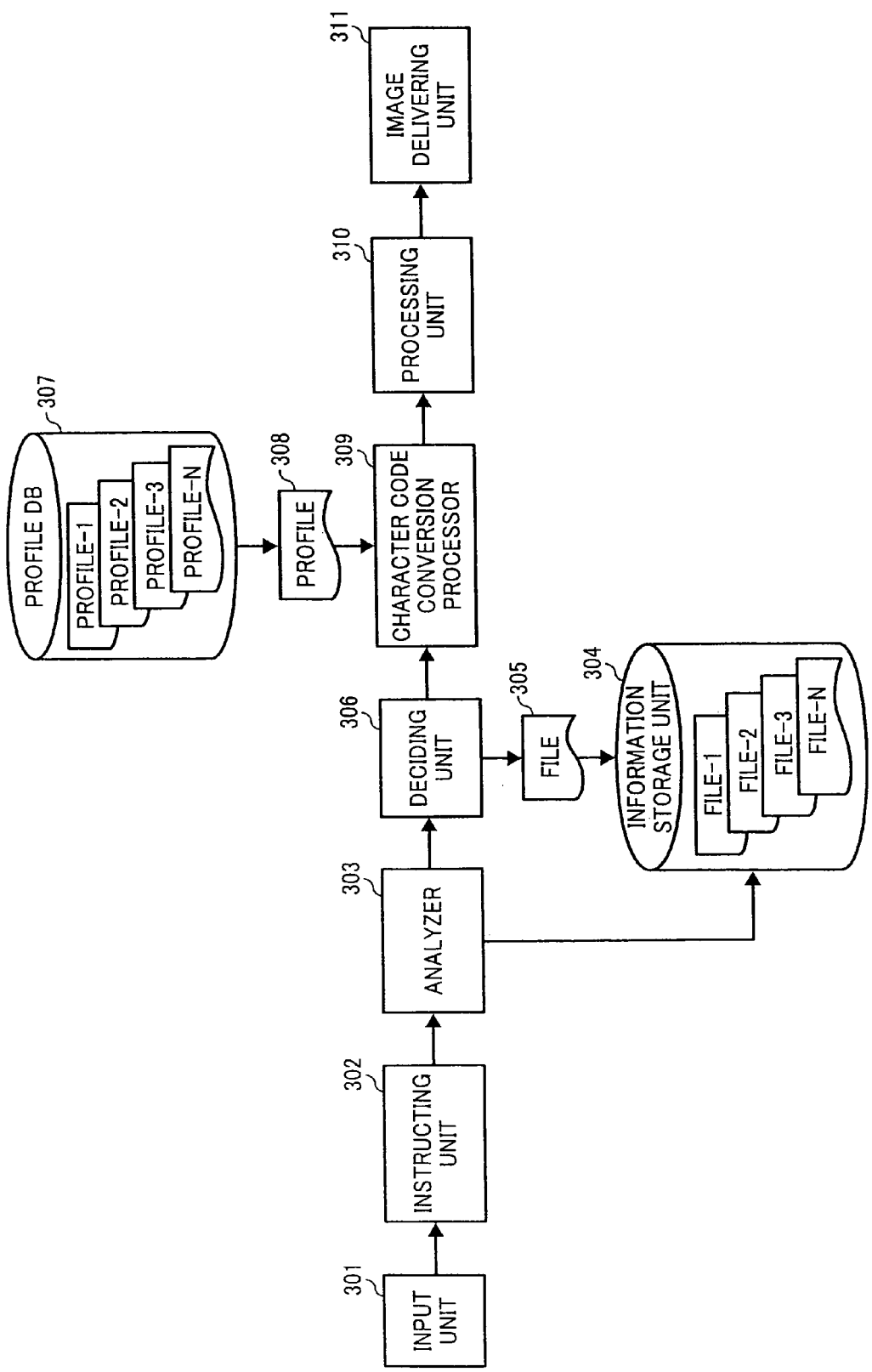
FIG. 8 is a block diagram of an image delivering apparatus according to a third embodiment of the present invention.

FIG. 8 is a block diagram of an image delivering apparatus according to the third embodiment. An information storage unit 304 includes information concerning recognition accuracy as character image information. As an example, a file 305 is supposed as containing recognition accuracy ratio obtained by performing pattern matching on the character image. Alternatively, the file 305 can include degree of dissimilarity with a standard character pattern. The contents of the file 305 are not limited to those mentioned above.

Any known pattern matching method can be used. For example, in one existing pattern matching method, an input character pattern is compared with a plurality of standard character patterns stored beforehand to derive cumulative distances (degrees of dissimilarity), and the standard pattern that has the least cumulative distance is identified. The category to which the identified standard pattern belongs is taken as a recognition outcome.

The character recognition accuracy ratio for the entire character image can be determined by calculating an average value of the recognition accuracy ratio of each character and selecting a subsequent process based on the average value. Alternatively, the least recognition ratio in the character image can be set as the accuracy ratio of the entire character image.

A determining unit 306 determines whether the characters in the input character image are to be converted to codes. A character code conversion processing unit 309 performs a code conversion process on the character determined by the determining unit to be converted to a code. Any existing code conversion process, such as the one disclosed in Japanese Patent Application Laid-open No. 2004-310250, can be used. The input unit 301, instructing unit 302, analyzer 303, profile 308, profile DB 307, processing unit 310, and image delivering unit 311 operate in the same manner as input unit 201, instructing unit 202, analyzer 203, profile 207, profile DB 206, processing unit 209 and image delivering unit 210, respectively, of FIG. 2.

Figure 9:
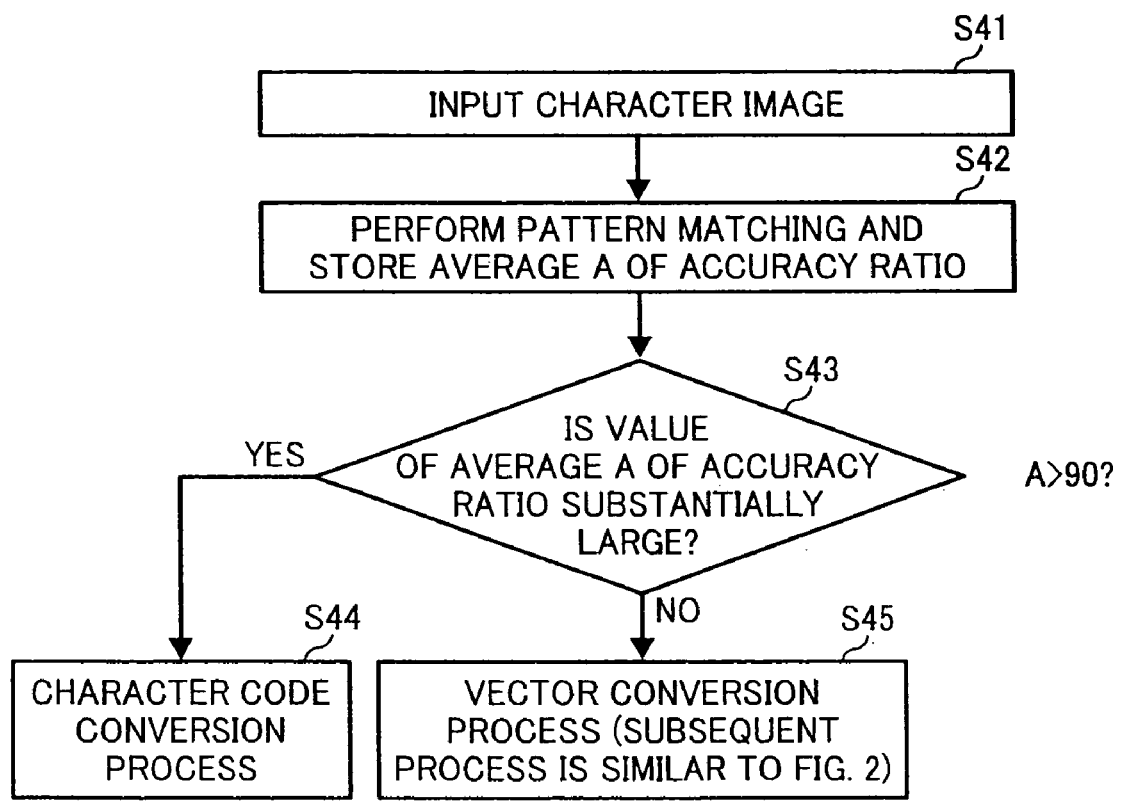
FIG. 9 is a flowchart of a process according to the third embodiment.

FIG. 9 is a flowchart of a process according to the third embodiment. Pattern matching is performed on the input character image and the average character recognition accuracy ratio is determined (steps S41 and S42). The average character recognition accuracy ratio is assessed by comparing it with a predetermined threshold value (step S43). The threshold value is set at the server end or by the user or by both. For example, if a threshold value of 90% is set, as the character recognition accuracy for all character images except for handwritten documents is generally over 90%, the characters having a character recognition accuracy ratio of over 90% is converted to code (step S44), and those below 90% are subjected to vector conversion process (step S45). The criteria for judging whether the accuracy ratio is high or low is set at the server end.

As in the first embodiment, in a fourth embodiment of the present invention, the vector conversion method is determined according to the display size of the character. However, in the first embodiment, if there are character strings of different character sizes in the character image, the average character size is determined, whereas in the fourth embodiment, the character strings of different character sizes are extracted, the vector conversion method for the character image of each character string of different size is determined, and the vector conversion process is executed for each character string.

Figure 10:
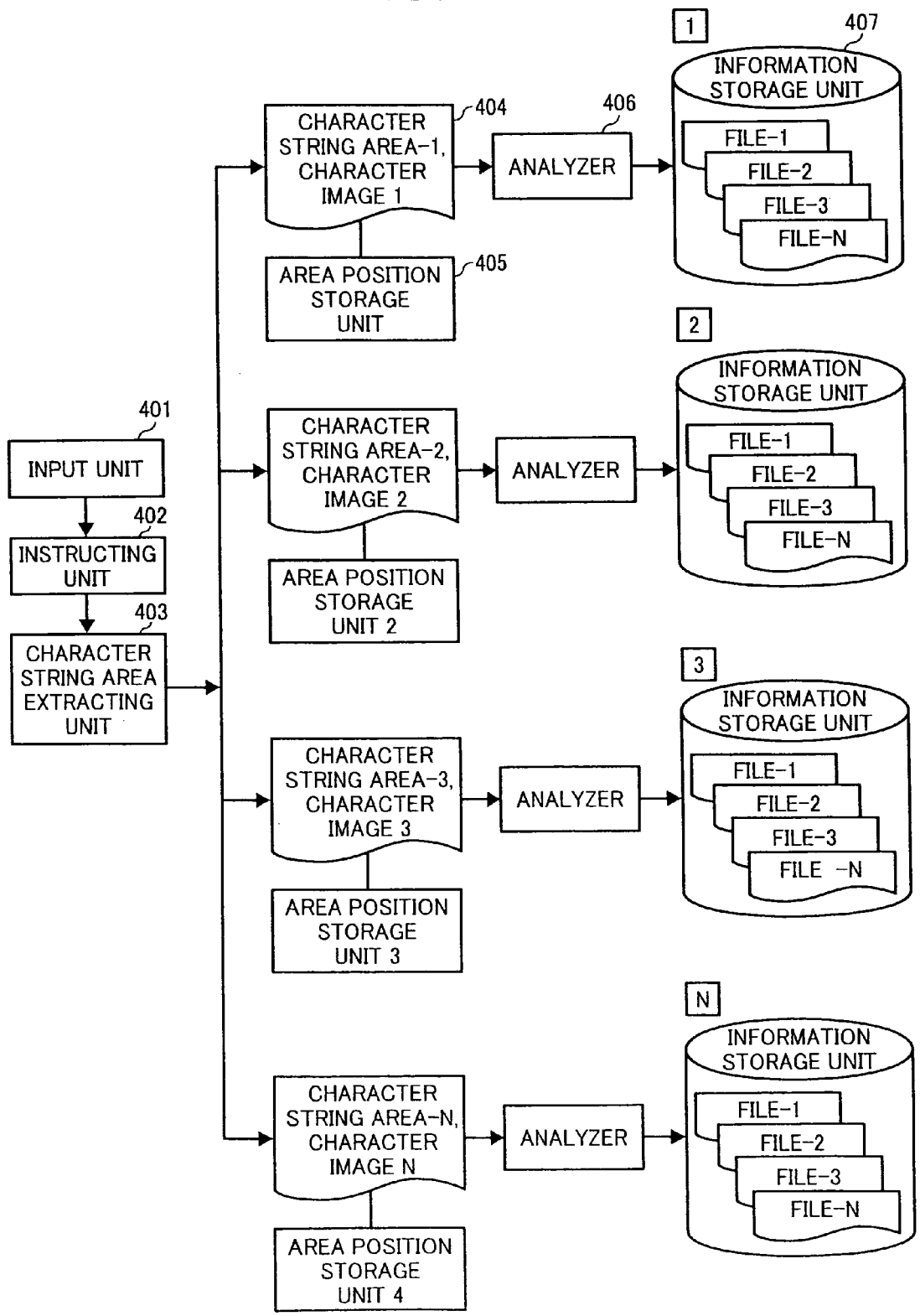
FIG. 10 is a schematic diagram of a pre-processing of an image delivering apparatus according to a fourth embodiment of the present invention.
Figure 11:
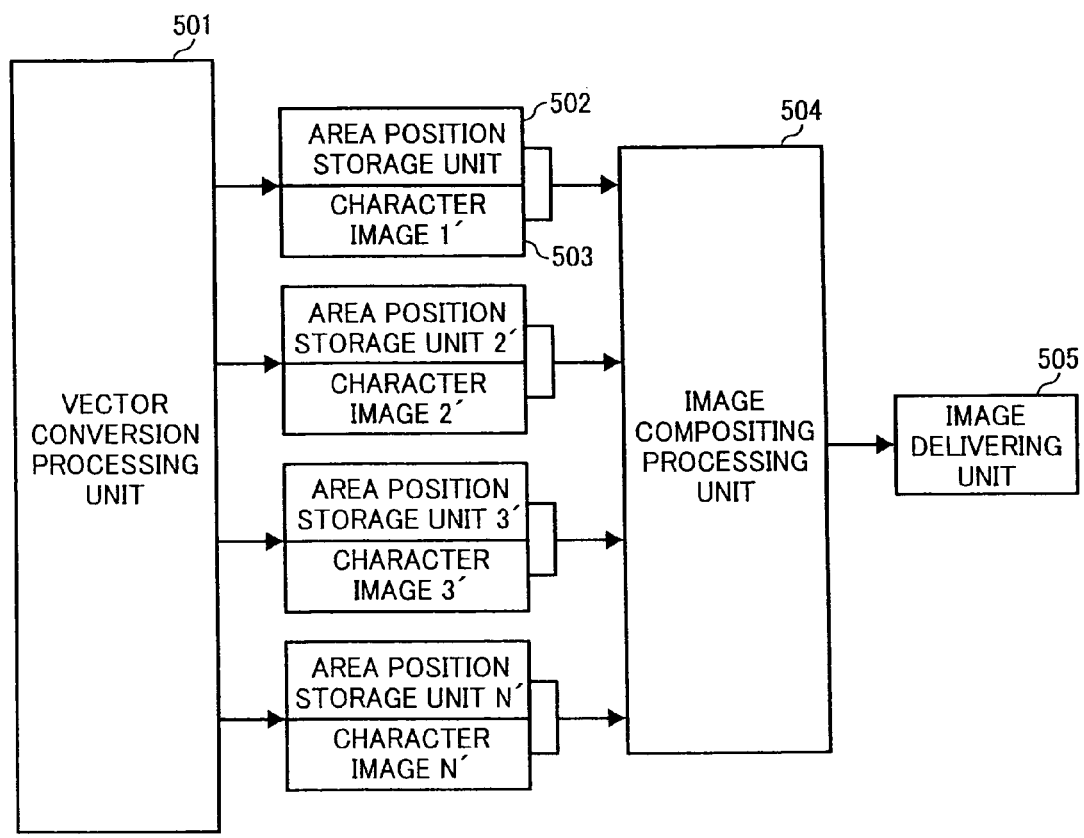
FIG. 11 is a schematic diagram of a post-processing of the image delivering apparatus according to the fourth embodiment.

FIG. 10 is a schematic diagram of a pre-processing of the image delivering apparatus according to the fourth embodiment that performs the pre-processing. FIG. 11 is a schematic diagram of a post-processing of the image delivering apparatus according to the fourth embodiment that performs the post-processing. When the character size is the criterion based on which the vector conversion method is determined, a character string area extracting unit 403 detects the character size and extracts the character string area for every character string of different size. The character string area extracting unit 403 can employ any existing character string area extraction method. For example, the character string area extracting unit 403 can use the technology disclosed in Japanese Patent Application Laid-open No. 2004-334461 to extract character string areas of character strings of same character size. Each of the extracted character string areas (character images) along with the data pertaining to the position of the character string in the image in 1 to N 404 are stored in an area position storage unit 405. The input unit 401 and instructing unit 402 operate in the same manner as input unit 201 and instructing unit 202, respectively of FIG. 2.

An analyzing unit 406 analyzes the data 404 stored in area position storage unit, and stores the image dimensions and the character' size of each character area in files 1 to N in an information storage unit 407. Each character string area is then treated as an input image, a vector conversion method is determined by referring to the information storage unit 407 and the profile DB 206, and the vector conversion process is performed.

In FIG. 11, character images 503 (1' to N') represent the vector data obtained as a result of the vector conversion process performed on the character images 1 to N by a vector conversion processing unit 501. An image compositing unit 504 composites the character images 503 (1' to N') by referring to an area position storage unit 502 (1 to N). Thereafter, an image delivering unit 505 delivers the vector data.

As described above, according to one aspect of the present invention, to improve legibility of character image on data output device, the character image is converted to vector data, which can be scaled to any size without loss of quality. In particular, a vector conversion method suitable to the character image and the environment of the display terminal device where the character image is to be displayed is selected. Consequently, display of a character image having excellent legibility and visual appeal can be realized.

Furthermore, according to another aspect of the present invention, the vector conversion method is selected based on data concerning the character image such as image data size or character size, and data concerning the display terminal device such as dimensions of the terminal monitor. Consequently, display of a character image having excellent legibility and visual appeal can be realized.

Moreover, according to still another aspect of the present invention, the processing power of the central processing unit and the file size of the image are taken as criteria for selecting the vector conversion method. Consequently, even if there are constraints in the processing power or the file size, a vector conversion method suited to the prevailing conditions can be selected.

Furthermore, according to still another aspect of the present invention, depending on the character image and the environment of the display terminal device, a vector conversion method is selected in which either a skeleton line or an edge line is converted to vector data. The vector conversion method in which the skeleton line is converted to vector data is effective for maintaining legibility of characters by prevention distortion of characters due to thin lines. The vector conversion method in which the edge line is converted to vector data is effective for a more faithful reproduction of the original image.

Moreover, according to still another aspect of the present invention, pattern matching is performed on the characters in the character image, and those characters having a high accuracy ratio are converted to character codes. The characters having a low accuracy ratio during pattern matching are not converted to character codes but are displayed as vector data. Consequently, there is improved reliability of the data in the displayed character image.

Furthermore, according to still another aspect of the present invention, the size of the terminal monitor is received as input of information concerning the display terminal device and vector data is created beforehand from the character image whose dimensions are adjusted to be displayed optimally on the terminal monitor after vector conversion process. Consequently, display of a character image having excellent legibility and visual appeal can be realized.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image delivering apparatus comprising:
   a determining unit that determines a vector conversion method among a plurality of vector conversion methods for a character image based on the character image, a file size of the character image, model information of a terminal device that receives the character image, and a processing power of a central processing unit of the terminal device, the plurality of vector conversion methods including a first vector conversion method and a second vector conversion method; and
   a processing unit that performs a vector conversion on the character image by the vector conversion method determined by the determining unit,
   wherein the determining unit first calculates a processing time based on the processing power and the file size, and the determining unit determines whether or not the calculated processing time is above a first threshold level, and
   wherein, if the calculated processing time is below the first threshold level, the determining unit second calculates a character size based on the character image and the model information, and the determining unit selects one of the first vector conversion method and the second vector conversion method based on whether or not the calculated size is above a second threshold level.

2. The image delivering apparatus according to claim 1, wherein the determining unit determines the vector conversion method based on a horizontal and vertical size of a monitor of the terminal device and at least one of a character size and a horizontal and vertical size of the character image.

3. The image delivering apparatus according to claim 1, wherein the processing unit includes
   a first converting unit that performs a vector conversion of a skeleton line of a character in the character image, and
   a second converting unit that performs a vector conversion of an edge line of the character in the character image.

4. The image delivering apparatus according to claim 1, wherein the processing unit includes
   a character code conversion determining unit that determines whether to convert a character to a code based on recognition accuracy of the character by performing a pattern matching on the character image, and
   a character code converting unit that converts the character to the code based on a determination result of the character code conversion determining unit in the character image.

5. The image delivering apparatus according to claim 1, further comprising:
   a pre-processing unit that processes the character image obtained from the vector conversion using the vector conversion method determined by the determining unit to obtain vector data suitable for display; and
   an image storage unit that stores the vector data obtained by the pre-processing unit.

6. An image delivering method comprising:
   determining, by a determining unit, a vector conversion method among a plurality of vector conversion methods for a character image based on the character image, a file size of the character image, model information of a terminal device that receives the character image, and a processing power of a central processing unit of the terminal device, the plurality of vector conversion methods including a first vector conversion method and a second vector conversion method; and
   performing, by a processing unit, a vector conversion on the character image by the vector conversion method determined at the determining a vector conversion method,
   wherein the determining includes,
      first calculating a processing time based on the processing power and the file size;
      determining whether or not the calculated processing time is above a first threshold level;
      if the calculated processing time is below the first threshold level, second calculating a character size based on the character image and the model information; and
      selecting one of the first vector conversion method and the second vector conversion method based on whether or not the calculated size is above a second threshold level.

7. The image delivering method according to claim 6, wherein the determining a vector conversion method includes determining the vector conversion method based on a horizontal and vertical size of a monitor of the terminal device and at least one of a character size and a horizontal and vertical size of the character image.

8. The image delivering method according to claim 6, wherein the performing includes
   performing a vector conversion of a skeleton line of a character in the character image, and
   performing a vector conversion of an edge line of the character in the character image.

9. The image delivering method according to claim 6, wherein the performing includes
   determining whether to convert a character to a code based on recognition accuracy of the character by performing a pattern matching on the character image, and
   converting the character to the code based on a determination result at the determining whether to convert a character to a code in the character image.

10. The image delivering method according to claim 6, further comprising:
   pre-processing, by a pre-processing unit, the character image obtained from the vector conversion using the vector conversion method determined at the determining a vector conversion method to obtain vector data suitable for display; and
   storing, by an image storage unit, the vector data obtained at the pre-processing.

* * * * *